US012728863B2

(12) United States Patent
Jung

(10) Patent No.: US 12,728,863 B2
(45) Date of Patent: Sep. 8, 2026

(54) APPARATUS AND METHOD FOR CONTROLLING A VEHICLE

(71) Applicants: HYUNDAI MOTOR COMPANY, Seoul (KR); KIA CORPORATION, Seoul (KR)

(72) Inventor: Chan Hee Jung, Seoul (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 71 days.

(21) Appl. No.: 18/635,811

(22) Filed: Apr. 15, 2024

(65) Prior Publication Data

US 2025/0100557 A1 Mar. 27, 2025

(30) Foreign Application Priority Data

Sep. 22, 2023 (KR) ........................ 10-2023-0127178

(51) Int. Cl.

| | |
|---|---|
| ***B60W 30/182*** | (2020.01) |
| ***B60W 30/08*** | (2012.01) |
| ***B60W 30/095*** | (2012.01) |
| ***B60W 30/14*** | (2006.01) |

(52) U.S. Cl.

CPC ...... *B60W 30/182* (2013.01); *B60W 30/0956* (2013.01); *B60W 30/146* (2013.01); *B60W 2030/082* (2013.01); *B60W 2520/105* (2013.01); *B60W 2520/125* (2013.01); *B60W 2520/14* (2013.01); *B60W 2520/18* (2013.01); *B60W 2554/402* (2020.02); *B60W 2554/80* (2020.02); *B60W 2556/45* (2020.02)

(58) Field of Classification Search

CPC ........... B60W 30/182; B60W 30/0956; B60W 30/146; B60W 2554/402; B60W 2556/45; B60W 2554/80; B60W 2030/082; B60W 2520/105; B60W 2520/125; B60W 2520/14; B60W 2520/18

See application file for complete search history.

(56) References Cited

U.S. PATENT DOCUMENTS

| | | | | |
|---|---|---|---|---|
| 2016/0200275 A1* | 7/2016 | Le Merrer | .............. | B60R 21/36 180/274 |
| 2019/0176814 A1* | 6/2019 | Yako | ...................... | B60W 30/08 |
| 2019/0179323 A1* | 6/2019 | Ewert | .................... | G08G 1/166 |

(Continued)

*Primary Examiner* — Mohamad O El Sayah

(74) *Attorney, Agent, or Firm* — Lempia Summerfield Katz LLC

(57) ABSTRACT

A vehicle control apparatus may include: a collision risk determination device, a collision determination device, and a processor. The processor may determine whether an external object is present within a specified distance from a vehicle, through the collision risk determination device. The processor may obtain an impact value associated with a collision between the vehicle and the external object based on an acceleration acting on the vehicle, a yaw rate of the vehicle, and a roll rate of the vehicle through the collision determination device. The processor may identify the collision between the vehicle and the external object based on the impact value exceeding an impact threshold value, and may change a driving mode of the vehicle from a first mode associated with an autonomous driving mode to a second mode controlled by a user based on identifying the collision between the vehicle and the external object.

18 Claims, 6 Drawing Sheets

VEHICLE CONTROL APPARATUS 100

PROCESSOR 110

COLLISION RISK DETERMINATION DEVICE 120

COLLISION DETERMINATION DEVICE 130

COMMUNICATION CIRCUIT 140

(56) References Cited

U.S. PATENT DOCUMENTS

| | | | | |
|---|---|---|---|---|
| 2020/0122674 | A1* | 4/2020 | Chen | B60R 21/231 |
| 2021/0387645 | A1* | 12/2021 | Kim | B60W 30/18154 |
| 2022/0219680 | A1* | 7/2022 | Nagaya | B60W 40/10 |
| 2025/0222735 | A1* | 7/2025 | Payagalage-Don | B60G 17/0195 |

* cited by examiner

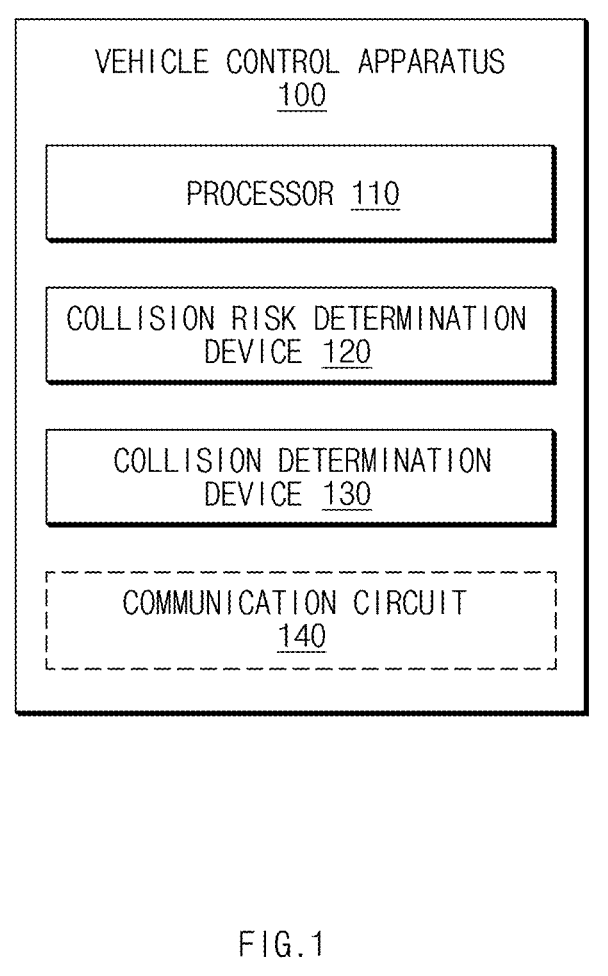

VEHICLE CONTROL APPARATUS 100

PROCESSOR 110

COLLISION RISK DETERMINATION DEVICE 120

COLLISION DETERMINATION DEVICE 130

COMMUNICATION CIRCUIT 140

FIG.1

APPARATUS AND METHOD FOR CONTROLLING A VEHICLE

CROSS-REFERENCE TO RELATED APPLICATION

This application claims the benefit of and priority to Korean Patent Application No. 10-2023-0127178, filed in the Korean Intellectual Property Office on Sep. 22, 2023, the entire contents of which are incorporated herein by reference.

TECHNICAL FIELD

The present disclosure relates to a vehicle control apparatus and a method thereof, and more specifically, relates to a technology for identifying a collision between a vehicle and an external object.

BACKGROUND

The statements in this section merely provide background information related to the present disclosure and may not constitute prior art.

With the development of a vehicle technology, the era of autonomous driving, in which vehicles are driving on a road by using their own determination, is coming. An autonomous vehicle may include an autonomous driving system for autonomous driving and may perform autonomous driving based on an autonomous driving system.

When an impact is applied to the autonomous vehicle, it is necessary to change from an autonomous driving mode (or a driving assistance mode) to a normal driving mode in which the autonomous vehicle is manually operated by the user. However, when assessing an impact on the autonomous vehicle solely based on the acceleration of the vehicle, the autonomous vehicle may be identified as colliding with an external object even when the vehicle encounters a speed bump, or the vehicle is driving through a pothole or sharp curves on the road.

SUMMARY

The present disclosure has been made to solve the above-mentioned problems occurring in the prior art while advantages achieved by the prior art are maintained intact.

An aspect of the present disclosure provides a vehicle control apparatus and method that identify a collision between a vehicle and an external object by using a distance between the vehicle and the external object, and an impact value.

Another aspect of the present disclosure provides a vehicle control apparatus and method that accurately identify the collision between the vehicle and the external object by identifying the collision between the vehicle and the external object based on an acceleration acting on the vehicle and the distance between the vehicle and the external object.

An aspect of the present disclosure provides a vehicle control apparatus that accurately operates in a driving mode of the vehicle by determining the driving mode of the vehicle based on identifying the collision between the vehicle and the external object, and a method thereof.

The technical problems to be solved by the present disclosure are not limited to the aforementioned problems, and any other technical problems not mentioned herein should be clearly understood from the following description by those having ordinary skill in the art to which the present disclosure pertains.

According to an aspect of the present disclosure, a vehicle control apparatus may include: a collision risk determination device, a collision determination device, and a processor. The processor may determine whether an external object is present within a specified distance from a vehicle, through the collision risk determination device, and may obtain an impact value associated with a collision between the vehicle and the external object based on an acceleration acting on the vehicle, a yaw rate of the vehicle, and a roll rate of the vehicle through the collision determination device. In addition, the processor may identify the collision between the vehicle and the external object based on the impact value exceeding an impact threshold value, and may change a driving mode of the vehicle from a first mode associated with an autonomous driving mode to a second mode controlled by a user based on identifying the collision between the vehicle and the external object.

In an embodiment, the acceleration acting on the vehicle may include a lateral acceleration acting in a lateral direction of the vehicle, a longitudinal acceleration acting in a longitudinal direction of the vehicle, and a vertical acceleration acting in a vertical direction of the vehicle.

In an embodiment, the processor may identify the external object within the specified distance from the vehicle for a specified time, and may identify the collision between the vehicle and the external object based on the impact value exceeding the impact threshold value for the specified time.

The vehicle control apparatus according to an embodiment may further include a communication circuit. The processor may receive object information including a type of the external object and a state of the external object through the communication circuit and may change the impact threshold value based on the object information.

In an embodiment, the processor may change the impact threshold value based on the type of the external object. For example, when the type of the external object is a first type indicating at least one of a pedestrian, a bicycle, or a two-wheeled vehicle, or any combination thereof, the processor may change the impact threshold value to a first impact threshold value. The processor may change the impact threshold value to a second impact threshold value, which exceeds the first impact threshold value, when the type of the external object is a second type indicating a passenger vehicle, and may change the impact threshold value to a third impact threshold value, which exceeds the second impact threshold value, when the type of the external object is a third type indicating at least one of a truck, a bus, or any combination thereof.

In an embodiment, the state of the external object includes at least one of a speed of the external object, or a direction in which the external object approaches the vehicle, or any combination thereof.

In an embodiment, the processor may apply a first weight to the impact threshold value based on the type of the external object and may apply a second weight to the impact threshold value based on a relative speed between the external object and the vehicle.

The vehicle control apparatus according to an embodiment may further include a communication circuit. The processor may change the driving mode of the vehicle from the first mode to the second mode and concurrently reduce a speed of the vehicle i) when an impact value exceeds the impact threshold value, and ii) when a difference between the impact value and the impact threshold value exceeds a reference value. The processor may transmit a signal indicating that the vehicle is in an emergency state, to an external electronic device including a server through the communication circuit.

In an embodiment, the processor may make a request for changing the driving mode of the vehicle from the first mode to the second mode based on a fact that the impact value exceeds the impact threshold value, and a difference between the impact value and the impact threshold value is smaller than or equal to a reference value, and may restrict an acceleration of the vehicle.

In an embodiment, the impact threshold value may include a threshold acceleration, a threshold yaw rate, and a threshold roll rate. The processor may identify that the impact value exceeds the impact threshold value, based on a fact that the acceleration acting on the vehicle exceeds the threshold acceleration, the yaw rate of the vehicle exceeds the threshold yaw rate, and the roll rate of the vehicle exceeds the threshold roll rate, and may identify the collision between the vehicle and the external object based on the impact value exceeding an impact threshold value.

According to an aspect of the present disclosure, a vehicle control method may include determining, by a processor, whether an external object is present within a specified distance from a vehicle, through a collision risk determination device, obtaining an impact value associated with a collision between the vehicle and the external object based on an acceleration acting on the vehicle, a yaw rate of the vehicle, and a roll rate of the vehicle through a collision determination device, identifying the collision between the vehicle and the external object based on the impact value exceeding an impact threshold value, and changing a driving mode of the vehicle from a first mode associated with an autonomous driving mode to a second mode controlled by a user based on identifying the collision between the vehicle and the external object.

In an embodiment, the acceleration acting on the vehicle may include a lateral acceleration acting in a lateral direction of the vehicle, a longitudinal acceleration acting in a longitudinal direction of the vehicle, and a vertical acceleration acting in a vertical direction of the vehicle.

According to an embodiment, the vehicle control method may further include identifying the external object within the specified distance from the vehicle for a specified time, and identifying the collision between the vehicle and the external object based on the impact value exceeding the impact threshold value for the specified time.

According to an embodiment, the vehicle control method may further include receiving object information including a type of the external object and a state of the external object through a communication circuit, and changing the impact threshold value based on the object information.

According to an embodiment, the vehicle control method may further include changing the impact threshold value to a first impact threshold value based on the type of the external object being a first type including at least one of a pedestrian, a bicycle, or a two-wheeled vehicle, or any combination thereof, changing the impact threshold value to a second impact threshold value exceeding the first impact threshold value based on the type of the external object being a second type including a passenger vehicle, and changing the impact threshold value to a third impact threshold value exceeding the second impact threshold value based on the type of the external object being a third type including at least one of a truck, or a bus, or any combination thereof.

In an embodiment, the state of the external object includes at least one of a speed of the external object, or a direction in which the external object approaches the vehicle, or any combination thereof.

According to an embodiment, the vehicle control method may further include applying a first weight to the impact threshold value based on the type of the external object, and applying a second weight to the impact threshold value based on a relative speed between the external object and the vehicle.

According to an embodiment, the vehicle control method may further include: changing the driving mode of the vehicle from the first mode to the second mode and concurrently reducing a speed of the vehicle i) when the impact value exceeds the impact threshold value, and ii) when a difference between the impact value and the impact threshold value exceeds a reference value; and transmitting a signal indicating that the vehicle is in an emergency state, to an external electronic device including a server through a communication circuit.

According to an embodiment, the vehicle control method may further include making a request for changing the driving mode of the vehicle from the first mode to the second mode based on a fact that the impact value exceeds the impact threshold value, and a difference between the impact value and the impact threshold value is smaller than or equal to a reference value, and restricting an acceleration of the vehicle.

In an embodiment, the impact threshold value may include a threshold acceleration, a threshold yaw rate, and a threshold roll rate. The vehicle control method may further include identifying that the impact value exceeds the impact threshold value, based on a fact that the acceleration acting on the vehicle exceeds the threshold acceleration, the yaw rate of the vehicle exceeds the threshold yaw rate, and the roll rate of the vehicle exceeds the threshold roll rate, and identifying the collision between the vehicle and the external object based on the impact value exceeding an impact threshold value.

BRIEF DESCRIPTION OF THE DRAWINGS

The above and other objects, features and advantages of the present disclosure should be more apparent from the following detailed description taken in conjunction with the accompanying drawings:

FIG. 1 shows an example of a block diagram of a vehicle control apparatus, according to an embodiment of the present disclosure;

DETAILED DESCRIPTION

Figure 2:
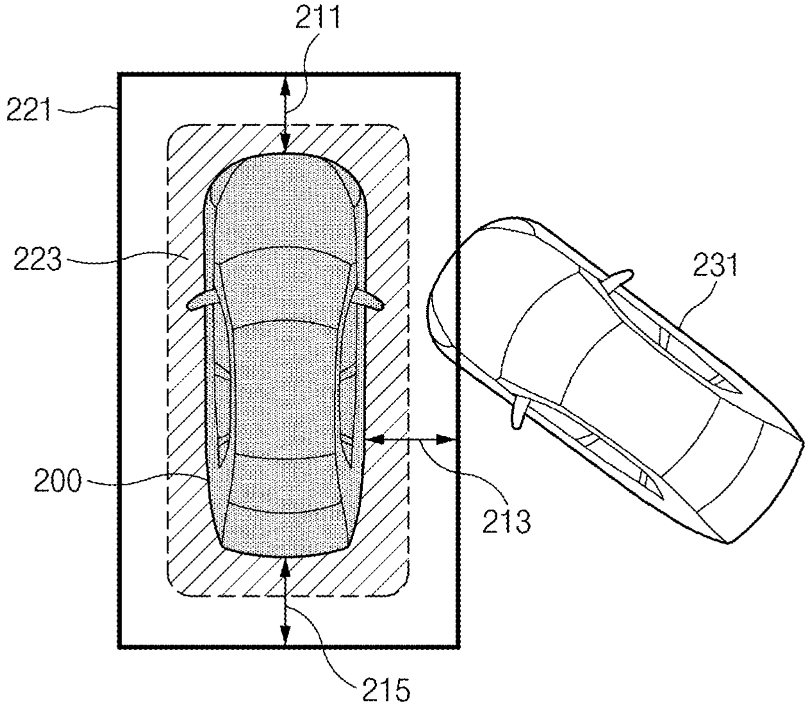
FIG. 2 shows an example associated with an external object identified within a specified distance from a vehicle, in an embodiment of the present disclosure.

Hereinafter, some embodiments of the present disclosure are described in detail with reference to the accompanying drawings. In adding reference numerals to components of each drawing, it should be noted that the same components have the same reference numerals, although they are indicated on another drawing. Furthermore, in describing the embodiments of the present disclosure, detailed descriptions associated with well-known functions or configurations are omitted when they may make subject matters of the present disclosure unnecessarily obscure.

In describing elements of an embodiment of the present disclosure, the terms first, second, A, B, (a), (b), and the like may be used herein. These terms are only used to distinguish one element from another element, but do not limit the corresponding elements irrespective of the nature, order, or priority of the corresponding elements. Furthermore, unless otherwise defined, all terms including technical and scientific terms used herein are to be interpreted as is customary in the art to which the present disclosure belongs. It should be understood that terms used herein should be interpreted as having a meaning that is consistent with their meaning in the context of the present disclosure and the relevant art and should not be interpreted in an idealized or overly formal sense unless expressly so defined herein.

When a component, device, element, or the like of the present disclosure is described as having a purpose or performing an operation, function, or the like, the component, device, or element should be considered herein as being "configured to" meet that purpose or to perform that operation or function.

Hereinafter, various embodiments of the present disclosure are described in detail with reference to FIGS. 1 to 6.

FIG. 1 shows an example of a block diagram of a vehicle control apparatus, according to an embodiment of the present disclosure.

Referring to FIG. 1, a vehicle control apparatus 100 according to an embodiment of the present disclosure may be implemented inside or outside a vehicle, and some of components included in the vehicle control apparatus 100 may be implemented inside or outside the vehicle. In one form, the vehicle control apparatus 100 may be integrated with internal control units of a vehicle and may be implemented with a separate device so as to be connected to control units of the vehicle by means of a separate connection means. For example, the vehicle control apparatus 100 may further include components not shown in FIG. 1.

Referring to FIG. 1, the vehicle control apparatus 100 according to an embodiment may include a processor 110, a collision risk determination device 120, and a collision determination device 130. For example, the vehicle control apparatus 100 may further include a communication circuit 140.

The processor 110, the collision risk determination device 120, the collision determination device 130, or the communication circuit 140 may be electrically and/or operably coupled with each other by an electronic component including a communication bus.

Hereinafter, the fact that pieces of hardware are coupled operably may include the fact that a direct and/or indirect connection between the pieces of hardware is established by wired and/or wirelessly such that second hardware is controlled by first hardware among the pieces of hardware.

Although different blocks are shown, an embodiment is not limited thereto. Some of the pieces of hardware in FIG. 1 may be included in a single integrated circuit including a system on a chip (SoC). The type and/or number of hardware included in the vehicle control apparatus 100 is not limited to that shown in FIG. 1. For example, the vehicle control apparatus 100 may include only some of the pieces of hardware shown in FIG. 1.

The vehicle control apparatus 100 according to an embodiment may include hardware for processing data based on one or more instructions. The hardware for processing data may include the processor 110.

For example, the hardware for processing data may include an arithmetic and logic unit (ALU), a floating point unit (FPU), a field programmable gate array (FPGA), a central processing unit (CPU), and/or an application processor (AP). The processor 110 may have a structure of a single-core processor, or may have a structure of a multi-core processor including a dual core, a quad core, a hexa core, or an octa core.

The communication circuit 140 included in the vehicle control apparatus 100 according to an embodiment may include a hardware component for supporting transmission and/or reception of signals between the vehicle control apparatus 100 and an external electronic device.

For example, the communication circuit 140 may include at least one of a MODEM, an antenna, or an optical/electronic (O/E) converter, or any combination thereof. For example, the communication circuit 140 may support transmission and/or reception of signals based on various types of protocols including at least one of Ethernet, local area network (LAN), wide area network (WAN), wireless fidelity (WiFi), Bluetooth, Bluetooth low energy (BLE), ZigBee, long term evolution (LTE), 5G new radio (NR), controller area network (CAN), or local interconnect network (LIN), or any combination thereof.

The collision risk determination device 120 included in the vehicle control apparatus 100 according to an embodiment may include at least one of a camera, LiDAR, or radar, or any combination thereof. For example, the collision risk determination device 120 may include hardware components for identifying an external object. For example, the collision risk determination device 120 may receive information associated with the external object. The collision risk determination device 120 may identify a distance between a vehicle and the external object.

The collision determination device 130 included in the vehicle control apparatus 100 according to an embodiment may include at least one of a gyro sensor, an angular velocity sensor, an acceleration sensor, a yaw rate sensor, or a roll rate sensor, or any combination thereof.

In an embodiment, the collision determination device 130 may receive sensor data from at least one of a gyro sensor, an angular velocity sensor, an acceleration sensor, a yaw rate sensor, a roll rate sensor, or any combination thereof. The collision determination device 130 may obtain an impact value associated with an impulse or impact force, which is applied to the vehicle, based on sensor data received from at least one of a gyro sensor, an angular velocity sensor, an acceleration sensor, a yaw rate sensor, a roll rate sensor, or any combination thereof.

The processor 110 of the vehicle control apparatus 100 according to an embodiment may determine whether an external object is present within a specified distance from the vehicle, through the collision risk determination device 120.

For example, the processor 110 may set a boundary area spaced from the vehicle by a specified distance. The processor 110 may identify an external object within the boundary area based on setting the boundary area spaced from the vehicle by a specified distance.

For example, the processor 110 may form a gray area within the boundary area. For example, the gray area may be formed within the boundary area and may be formed based on a reference distance smaller than a specified distance. For example, the reference distance may be obtained based on applying a specified ratio (e.g., approximately 50%) to the specified distance.

The processor 110 of the vehicle control apparatus 100 according to an embodiment may obtain an impact value associated with a collision between the vehicle and the external object through the collision determination device 130 based on an acceleration acting on the vehicle, a yaw rate of the vehicle, and a roll rate of the vehicle. Hereinafter, the acceleration acting on the vehicle may include the amount of change in acceleration acting on the vehicle.

In an embodiment, the processor 110 may obtain the impact value associated with the collision between the vehicle and the external object based on at least one of the acceleration acting on the vehicle, the yaw rate of the vehicle, the roll rate of the vehicle, a pitch rate of the vehicle, or any combination thereof.

For example, the acceleration acting on the vehicle may include a lateral acceleration acting in a lateral direction of the vehicle, a longitudinal acceleration acting in a longitudinal direction of the vehicle, and a vertical acceleration acting in a vertical direction of the vehicle. For example, the lateral direction of the vehicle may include a direction corresponding to a left surface or a right surface of the vehicle. For example, the longitudinal direction of the vehicle may include a direction corresponding to a front surface or a rear surface of the vehicle. For example, the vertical direction of the vehicle may include a direction corresponding to a top surface or a bottom surface of the vehicle.

In an embodiment, the processor 110 may obtain the impact value based on an acceleration acting on the vehicle. In an embodiment, the processor 110 may obtain the impact value based on the yaw rate of the vehicle, the roll rate of the vehicle, and the pitch rate of the vehicle. In an embodiment, the processor 110 may obtain the impact value based on at least one of the acceleration acting on the vehicle, the yaw rate of the vehicle, the roll rate of the vehicle, or the pitch rate of the vehicle, or any combination thereof, and may identify the collision between the vehicle and an external object based on the obtained impact value.

For example, the processor 110 may obtain the impact value based on inertial measurement unit (IMU) sensor data. For example, the IMU sensor data may include at least one of the acceleration acting on the vehicle, the yaw rate of the vehicle, the roll rate of the vehicle, or the pitch rate of the vehicle, or any combination thereof. For example, the processor 110 may obtain an impact value based on the IMU sensor data, and may identify the collision between the vehicle and the external object by using the obtained impact value.

In an embodiment, the processor 110 may identify the collision between the vehicle and the external object based on the impact value associated with the collision between the vehicle and the external object exceeding an impact threshold value.

For example, the processor 110 may identify an external object within a specified distance from the vehicle for a specified time, and may identify the collision between the vehicle and the external object based on the fact that the impact value exceeds the impact threshold value for the specified time.

For example, the processor 110 may identify an external object within the boundary area for a specified time, and may identify the collision between the vehicle and the external object based on the impact value exceeding the impact threshold value for the specified time.

For example, the processor 110 may identify the external object within the gray area formed in the boundary area for a specified time, and may identify the collision between the vehicle and the external object based on the impact value exceeding the impact threshold value for the specified time.

In an embodiment, the processor 110 may receive object information including the type of the external object and the state of the external object through the communication circuit 140.

For example, the type of the external object may include at least one of a pedestrian, a bicycle, a two-wheeled vehicle, a power two wheel (PTW), a passenger vehicle, a truck, or a bus, or any combination thereof. For example, the PTW may include a two-wheeled electric vehicle including a motorcycle. However, the PTW is not limited to two-wheeled electric vehicles. For example, the PTW may include various types of vehicles, in each of which a passenger is exposed to the outside, such as three-wheeled electric vehicles. The type of the external object is not limited to the examples described above.

For example, the state of the external object may include at least one of a speed of the external object, or a direction in which the external object approaches the vehicle, or any combination thereof.

In an embodiment, the processor 110 may identify that the type of the external object is a first type indicating at least one of a pedestrian, a bicycle, or a two-wheeled vehicle, or any combination thereof. For example, the processor 110 may identify that the type of the external object is a first type indicating at least one of a pedestrian, a bicycle, or a two-wheeled vehicle, or any combination thereof based on object information received through the communication circuit 140. For example, the processor 110 may change the impact threshold value to the first impact threshold value when the type of the external object is the first type indicating at least one of a pedestrian, a bicycle, or a two-wheeled vehicle, or any combination thereof. For example, the first impact threshold value may include a threshold value for identify a collision between the vehicle and a small external object including a pedestrian.

In an embodiment, the processor 110 may identify that the type of the external object is a second type indicating a passenger vehicle. For example, the processor 110 may identify that the type of the external object is the second type indicating a passenger vehicle based on object information received through the communication circuit 140. For example, the processor 110 may change the impact threshold value to a second impact threshold value exceeding the first impact threshold value, based on the type of the external object being the second type including a passenger vehicle. For example, the second impact threshold value may include a threshold value for identifying a collision between the vehicle and a medium-sized external object that is larger in size than the small external object including a pedestrian, and is smaller than a large external object including a truck.

In an embodiment, the processor 110 may identify that the type of the external object is a third type indicating at least one of a truck, or a bus, or any combination thereof. For example, the processor 110 may identify that the type of the external object is the third type indicating at least one of a truck, or a bus, or any combination thereof based on object information received through the communication circuit 140. For example, the processor 110 may change the impact threshold value to a third impact threshold value exceeding the second impact threshold value when the type of the external object is a third type indicating at least one of a truck, or a bus, or any combination thereof. For example, the third impact threshold value may include a threshold value for identifying a collision between the vehicle and a large external object that is larger in size than the medium-sized external object including a passenger vehicle.

In an embodiment, the processor 110 may apply a weight to the impact threshold value based on the type of the external object. For example, the processor 110 may identify that the type of the external object is one of the first type including at least one of a pedestrian, a bicycle, or a two-wheeled vehicle, or any combination thereof, the second type that includes a passenger vehicle, or the third type that includes at least one of a truck, or a bus, or any combination thereof. For example, the processor 110 may apply a weight corresponding to the type of the external object based on whether the type of the external object is one of the first type, the second type, or the third type.

For example, the processor 110 may apply a first weight to the impact threshold value based on the type of the external object. For example, the processor 110 may apply a second weight to the impact threshold value based on a relative speed between the external object and the vehicle. For example, as the relative speed between the external object and the vehicle is great, the processor 110 may apply a relatively great second weight to the impact threshold value.

For example, the processor 110 may apply a first partial weight, which is included in the first weight, to the impact threshold value when the type of the external object is the first type indicating at least one of a pedestrian, a bicycle, or a two-wheeled vehicle, or any combination thereof.

For example, the processor 110 may apply a second partial weight, which is included in the first weight, to the impact threshold value when the type of the external object is the second type indicating a passenger vehicle. For example, the second partial weight may include a partial weight greater than the first partial weight.

For example, the processor 110 may apply a third partial weight, which is included in the first weight, to the impact threshold value when the type of the external object is the third type indicating at least one of a truck, or a bus, or any combination thereof. For example, the third partial weight may include a partial weight greater than the second partial weight.

For example, the processor 110 may apply a second weight to the impact threshold value based on the relative speed between the external object and the vehicle. For example, as the relative speed between the external object and the vehicle is great, the processor 110 may apply a relatively great second weight to the impact threshold value.

For example, the processor 110 may apply a fourth partial weight, which is included in the second weight, to the impact threshold value based on the relative speed between the external object and the vehicle identified in a first section.

For example, the processor 110 may apply a fifth partial weight, which is included in the second weight, to the impact threshold value based on the relative speed between the external object and the vehicle identified in a second section including the minimum value corresponding to the maximum value of the first section. For example, the fifth partial weight may include a partial weight greater than the fourth partial weight.

The relative speed between the external object and the vehicle is described in the case of the first section and in the case of the second section. However, an embodiment of the present disclosure is not limited to the above-described example. For example, the processor 110 may divide the relative speed between the external object and the vehicle into the first section, the second section, and the third section. The fourth partial weight corresponding to the first section, the fifth partial weight corresponding to the second section, or the sixth partial weight corresponding to the third section may be applied to the impact threshold value.

In an embodiment, the processor 110 may identify a threshold acceleration included in the impact threshold value, a threshold yaw rate included in the impact threshold value, and a threshold roll rate included in the impact threshold value. For example, the impact threshold value may include the threshold acceleration, the threshold yaw rate, and the threshold roll rate. For example, the threshold acceleration may include a threshold lateral acceleration, a threshold longitudinal acceleration, and a threshold vertical acceleration.

In an embodiment, the processor 110 may identify that the acceleration acting on the vehicle exceeds the threshold acceleration.

For example, the processor 110 may identify that the lateral acceleration acting on the vehicle exceeds the threshold lateral acceleration. For example, the processor 110 may identify that the longitudinal acceleration acting on the vehicle exceeds the threshold longitudinal acceleration. For example, the processor 110 may identify that the vertical acceleration acting on the vehicle exceeds the threshold vertical acceleration.

For example, the processor 110 may identify that the yaw rate of the vehicle exceeds the threshold yaw rate. For example, the processor 110 may identify that the roll rate of the vehicle exceeds the threshold roll rate.

For example, the processor 110 may identify that the impact value exceeds the impact threshold value, based on the fact that the acceleration acting on the vehicle exceeds the threshold acceleration, the yaw rate of the vehicle exceeds the threshold yaw rate, and the roll rate of the vehicle exceeds the threshold roll rate. For example, the processor 110 may identify the collision between the vehicle and the external object based on the impact value exceeding the impact threshold value.

For example, the processor 110 may identify the collision between the vehicle and the external object based on the fact that the lateral acceleration acting on the vehicle exceeds the threshold lateral acceleration, the longitudinal acceleration acting on the vehicle exceeds the threshold longitudinal acceleration, the vertical acceleration acting on the vehicle exceeds the threshold vertical acceleration, the yaw rate of the vehicle exceeds the threshold yaw rate, and the roll rate of the vehicle exceeds the threshold roll rate.

In an embodiment, the processor 110 may obtain an impact value associated with the collision between the vehicle and the external object through the collision determination device 130 based on the acceleration acting on the vehicle, the yaw rate of the vehicle, and the roll rate of the vehicle. The processor 110 may identify the collision between the vehicle and the external object based on the impact value exceeding the impact threshold value. The processor 110 may change the driving mode of the vehicle from a first mode associated with an autonomous driving mode to a second mode controlled by the user based on identifying the collision between the vehicle and the external object.

In an embodiment, when the impact value exceeds the impact threshold value and when a difference between the impact value and the impact threshold value exceeds a reference value, the processor 110 may reduce the speed of the vehicle and may concurrently change the driving mode of the vehicle from the first mode to the second mode. The processor 110 may transmit a signal (e.g., an SOS signal) indicating that the vehicle is in an emergency state, to an external electronic device including a server through the communication circuit 140. For example, the processor 110 may transmit the signal indicating that the vehicle is in an emergency state, to the external electronic device including a server through the communication circuit 140 based on the fact that the impact value exceeds the impact threshold value, and the difference between the impact value and the impact threshold value exceeds the reference value.

In an embodiment, the processor 110 may make a request for changing the driving mode of the vehicle from the first mode to the second mode based on the fact that an impact value exceeds the impact threshold value, and the difference between the impact value and the impact threshold value is smaller than or equal to the reference value. The processor 110 may restrict the acceleration of the vehicle. For example, the processor 110 may restrict the acceleration of the vehicle based on the fact that an impact value exceeds the impact threshold value, and the difference between the impact value and the impact threshold value is smaller than or equal to the reference value.

As described above, the processor 110 of the vehicle control apparatus 100 according to an embodiment may identify the collision between the vehicle and the external object based on whether the external object is present around the vehicle, and the impact value associated with the vehicle. The processor 110 may accurately identify the collision between the vehicle and the external object by identifying the collision between the vehicle and the external object based on whether the external object is present around the vehicle, and the impact value associated with the vehicle. Moreover, the processor 110 may easily respond to accidents by changing the driving mode of the vehicle based on identifying the collision between the vehicle and the external object.

FIG. 2 shows an example associated with an external object identified within a specified distance from a vehicle, in an embodiment of the present disclosure.

Referring to FIG. 2, a vehicle control apparatus (e.g., the vehicle control apparatus 100 of FIG. 1) according to an embodiment may be included in a vehicle 200. A processor (e.g., the processor 110 in FIG. 1) of the vehicle control apparatus may identify a distance between the vehicle 200 and an external object 231. For example, the processor may identify whether the external object 231 is present within a specified distance 211, 213, or 215 from the vehicle 200. For example, the specified distances 211, 213, and 215 may include the first specified distance 211 measured from a front surface of the vehicle, the second specified distance 213 measured from a side surface of the vehicle, and the third specified distance 215 measured from a rear surface of the vehicle. The first specified distance 211, the second specified distance 213, and the third specified distance 215 may be different from each other or may be the same as each other. As described above, the first specified distance 211, the second specified distance 213, and the third specified distance 215 are not limited thereto.

In an embodiment, the processor may set a boundary area 221 based on the specified distance 211, 213, and 215. For example, the processor may determine whether the external object 231 is present within the boundary area 221, based on setting the boundary area 221.

For example, the processor may identify whether the external object 231 is present within the boundary area 221, based on the fusion sensing result of an autonomous driving sensor (e.g., at least one of a camera, LiDAR, or radar, or any combination thereof).

For example, the processor may identify a gray area 223 within the boundary area 221. For example, the processor may determine whether the external object 231 is present within the gray area 223.

In an embodiment, the processor may determine whether the external object 231 is present within the boundary area 221 or the gray area 223. The processor may transmit, to a collision determination device (e.g., the collision determination device 130 in FIG. 1), information indicating that the external object 231 is present within the boundary area 221 or the gray area 223 based on the fact that the external object 231 is present within the boundary area 221 or the gray area 223.

For example, the processor may transmit, to the collision determination device, information indicating that the external object 231 is present within the boundary area 221 or the gray area 223, for a specified time based on the fact that the external object 231 is present within the boundary area 221 or the gray area 223.

In an embodiment, the processor may identify a collision between the vehicle 200 and the external object 231 based on the fact that the external object 231 is present within the boundary area 221 or the gray area 223, and the impact value exceeding the impact threshold value is identified, for a specified time.

As described above, the processor included in the vehicle control apparatus according to an embodiment may accurately identify the collision between the vehicle 200 and the external object 231 for the specified time by identifying the collision between the vehicle 200 and the external object 231 based on the fact that the external object 231 is present within the boundary area 221 or the gray area 223, and an impact value exceeding the impact threshold value is identified.

Figure 3:
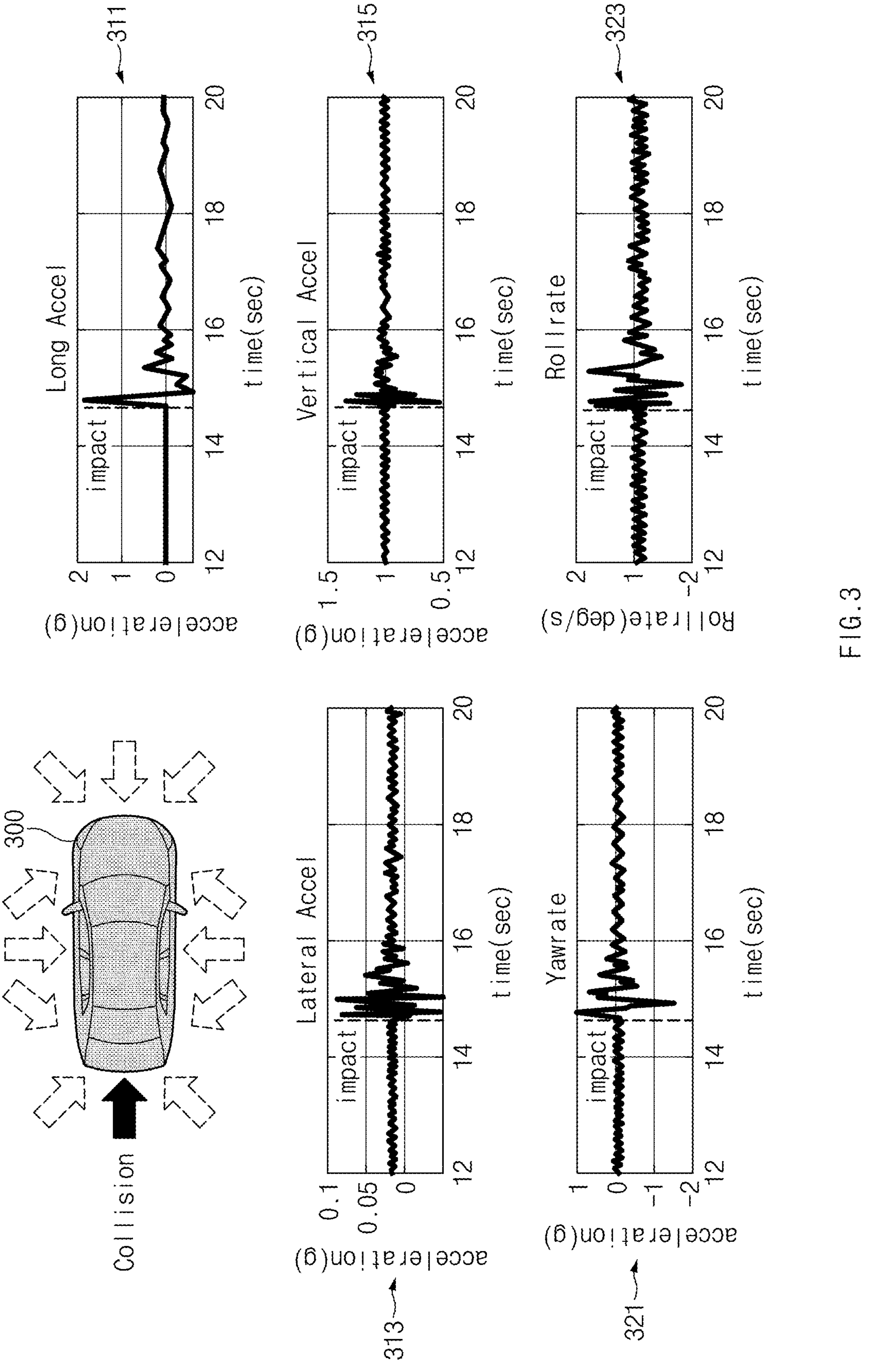
FIG. 3 shows an example associated with an acceleration of a vehicle, a yaw rate of the vehicle, and a roll rate of the vehicle, in an embodiment of the present disclosure.

FIG. 3 shows an example associated with an acceleration of a vehicle, a yaw rate of the vehicle, and a roll rate of the vehicle, in an embodiment of the present disclosure.

Referring to FIG. 3, a vehicle control apparatus (e.g., the vehicle control apparatus 100 of FIG. 1) according to an embodiment may be included in a vehicle 300. For example, a processor of the vehicle control apparatus may identify at least one of an acceleration acting on the vehicle 300, a yaw rate of the vehicle 300, or a roll rate of the vehicle 300, or any combination thereof by using a collision determination device (e.g., the collision determination device 130 in FIG. 1).

A first graph 311 in FIG. 3 may include a graph indicating a longitudinal acceleration acting in a longitudinal direction of a vehicle. A second graph 313 in FIG. 3 may include a graph indicating a lateral acceleration acting in a lateral direction of the vehicle. A third graph 315 of FIG. 3 may include a graph indicating a vertical acceleration acting in a vertical direction of the vehicle. A fourth graph 321 of FIG. 3 may include a graph indicating a yaw rate of the vehicle. A fifth graph 323 in FIG. 3 may include a graph indicating a roll rate of the vehicle.

For example, the processor may identify that the longitudinal acceleration acting in the longitudinal direction of the vehicle 300 exceeds a threshold longitudinal acceleration. For example, the processor may identify that the lateral acceleration acting in the lateral direction of the vehicle 300 exceeds a threshold lateral acceleration. For example, the processor may identify that the vertical acceleration acting in the vertical direction of the vehicle 300 exceeds a threshold vertical acceleration. For example, the processor may identify that the yaw rate of the vehicle 300 exceeds a threshold yaw rate. For example, the processor may identify that the roll rate of the vehicle 300 exceeds a threshold roll rate.

In the first graph 311, the processor may identify that the longitudinal acceleration of the vehicle 300 exceeds 1. In the second graph 313, the processor may identify that the lateral acceleration of the vehicle 300 exceeds 0.05. In the third graph 315, the processor may identify that the vertical acceleration of the vehicle 300 exceeds 0.5. In the fourth graph 321, the processor may identify that the yaw rate of the vehicle 300 exceeds 0.5. In the fifth graph 323, the may identify that the roll rate of the vehicle 300 exceeds 1.

For example, the processor may identify a conflict between the vehicle 300 and an external object, based on the fact that the longitudinal acceleration of the vehicle 300 exceeds 1, the lateral acceleration of the vehicle 300 exceeds 0.05, the vertical acceleration of the vehicle 300 exceeds 0.5, the yaw rate of the vehicle 300 exceeds 0.5, and the roll rate of the vehicle 300 exceeds 1. However, an example of the collision between the vehicle 300 and an external object is not limited to the above-described example.

Figure 4:
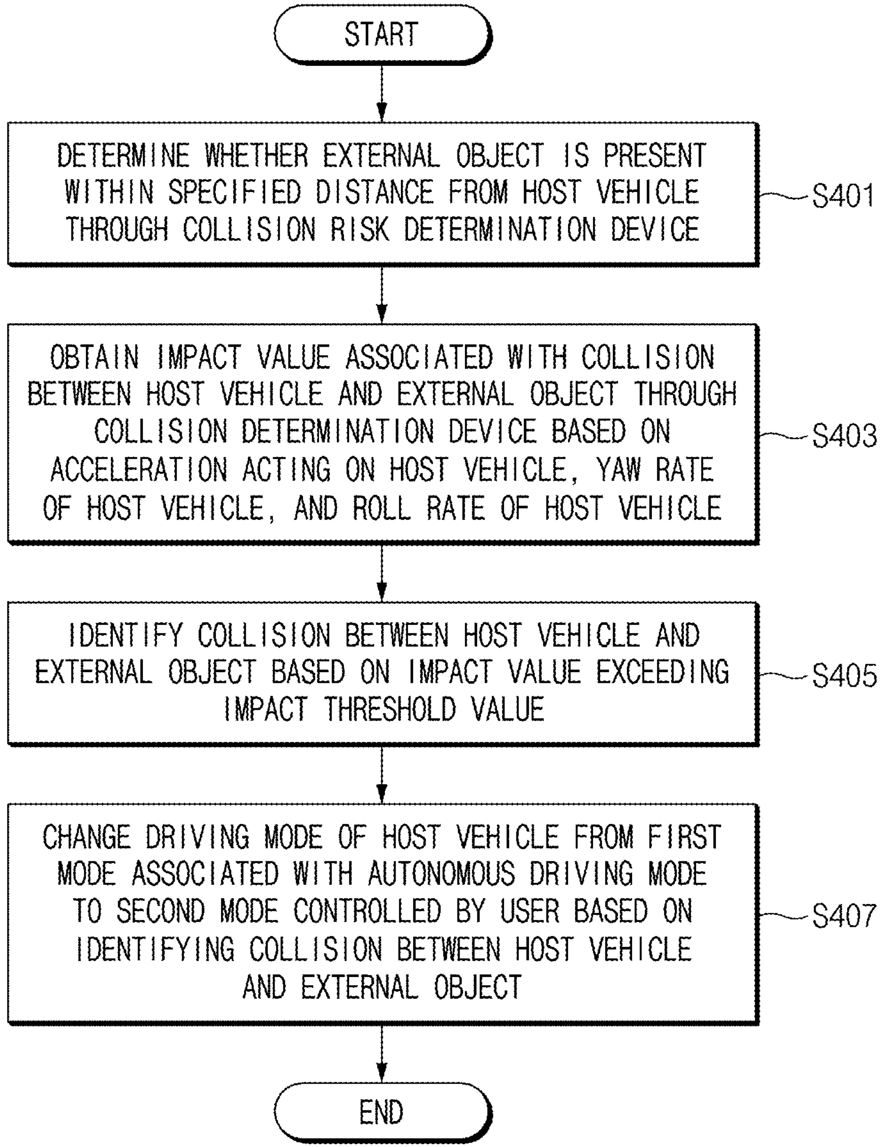
FIG. 4 is a flowchart illustrating a vehicle control method according to an embodiment of the present disclosure.

FIG. 4 shows an example of a flowchart associated with a vehicle control method, according to an embodiment of the present disclosure.

Hereinafter, it is assumed that the vehicle control apparatus 100 of FIG. 1 performs the process of FIG. 4. In addition, in a description of FIG. 4, it may be understood that an operation described as being performed by a processor is controlled by the processor 110 of the vehicle control apparatus 100.

At least one of operations of FIG. 4 may be performed by the vehicle control apparatus 100 of FIG. 1. Each of the operations in FIG. 4 may be performed sequentially, but is not necessarily sequentially performed. For example, the order of operations may be changed, and at least two operations may be performed in parallel.

Referring to FIG. 4, in operation S401, a vehicle control method according to an embodiment may include an operation of determining, by a processor (e.g., the processor 110 in FIG. 1), whether an external object is present within a specified distance from a vehicle through a collision risk determination device (e.g., the collision risk determination device 120 in FIG. 1).

In operation S403, the vehicle control method according to an embodiment may include an operation of obtaining an impact value associated with a collision between the vehicle and an external object through a collision determination device (e.g., the collision determination device 130 in FIG. 1) based on an acceleration acting on the vehicle, a yaw rate of the vehicle, and a roll rate of the vehicle.

For example, the acceleration acting on the vehicle may include a lateral acceleration acting in a lateral direction of the vehicle, a longitudinal acceleration acting in a longitudinal direction of the vehicle, and a vertical acceleration acting in a vertical direction of the vehicle.

In operation S405, the vehicle control method according to an embodiment may include an operation of identifying the collision between the vehicle and the external object based on the impact value exceeding an impact threshold value.

For example, the vehicle control method may include an operation of identifying the external object within the specified distance from the vehicle for a specified time, and identifying the collision between the vehicle and the external object based on the fact that the impact value exceeds the impact threshold value for the specified time.

For example, the vehicle control method may include an operation of receiving object information including the type of the external object and a state of the external object through a communication circuit (e.g., the communication circuit 140 in FIG. 1). For example, the vehicle control method may include an operation of changing the impact threshold value based on the object information including the type of the external object and the state of the external object. For example, the state of the external object may include at least one of a speed of the external object, or a direction in which the external object approaches the vehicle, or any combination thereof.

For example, the vehicle control method may include an operation of changing the impact threshold value to a first impact threshold value based on the type of the external object being a first type including at least one of a pedestrian, a bicycle, or a two-wheeled vehicle, or any combination thereof.

For example, the vehicle control method may include an operation of changing the impact threshold value to a second impact threshold value exceeding the first impact threshold value, based on the type of the external object being the second type including a passenger vehicle.

For example, the vehicle control method may include an operation of changing the impact threshold value to a third impact threshold value exceeding the second impact threshold value based on the type of the external object being a third type including at least one of a truck, or a bus, or any combination thereof.

For example, the vehicle control method may include an operation of applying a first weight to the impact threshold value based on the type of the external object.

For example, the vehicle control method may include an operation of applying a second weight to the impact threshold value based on the relative speed between the external object and the vehicle.

In an embodiment, the impact threshold value may include a threshold acceleration, a threshold yaw rate, and a threshold roll rate. According to an embodiment, the vehicle control method may include an operation of identifying that the impact value exceeds the impact threshold value, based on the fact that the acceleration acting on the vehicle exceeds the threshold acceleration, the yaw rate of the vehicle exceeds the threshold yaw rate, and the roll rate of the vehicle exceeds the threshold roll rate. The vehicle control method may include an operation of identifying the collision between the vehicle and the external object based on identifying that the impact value exceeds the impact threshold value by using an acceleration, a yaw rate, and a roll rate.

In operation S407, the vehicle control method according to an embodiment may include an operation of changing a driving mode of the vehicle from a first mode associated with an autonomous driving mode to a second mode controlled by a user based on identifying the collision between the vehicle and the external object.

For example, the vehicle control method may include an operation of changing the driving mode of the vehicle from the first mode associated with an autonomous driving mode to a second mode controlled by a user, and concurrently reducing the speed of the vehicle based on: i) the impact value that exceeds the impact threshold value, and ii) a difference, between the impact value and the impact threshold value, that exceeds a reference value. For example, the vehicle control method may include an operation of transmitting a signal indicating that the vehicle is in an emergency state, to an external electronic device including a server through a communication circuit.

For example, the vehicle control method may include an operation of making a request for changing the driving mode of the vehicle from the first mode associated with an autonomous driving mode to a second mode controlled by a user based on the impact value exceeding the impact threshold value and a difference between the impact value and the impact threshold value being smaller than or equal to a reference value. The vehicle control method may include an operation of restricting an acceleration of the vehicle.

As described above, the vehicle control method according to an embodiment may include an operation of identifying the collision between the vehicle and the external object based on whether the external object is present around the vehicle, and the impact value associated with the vehicle. The vehicle control method may include an operation of accurately identifying the collision between the vehicle and the external object by identifying the collision between the vehicle and the external object based on whether the external object is present around the vehicle, and the impact value associated with the vehicle.

Figure 5:
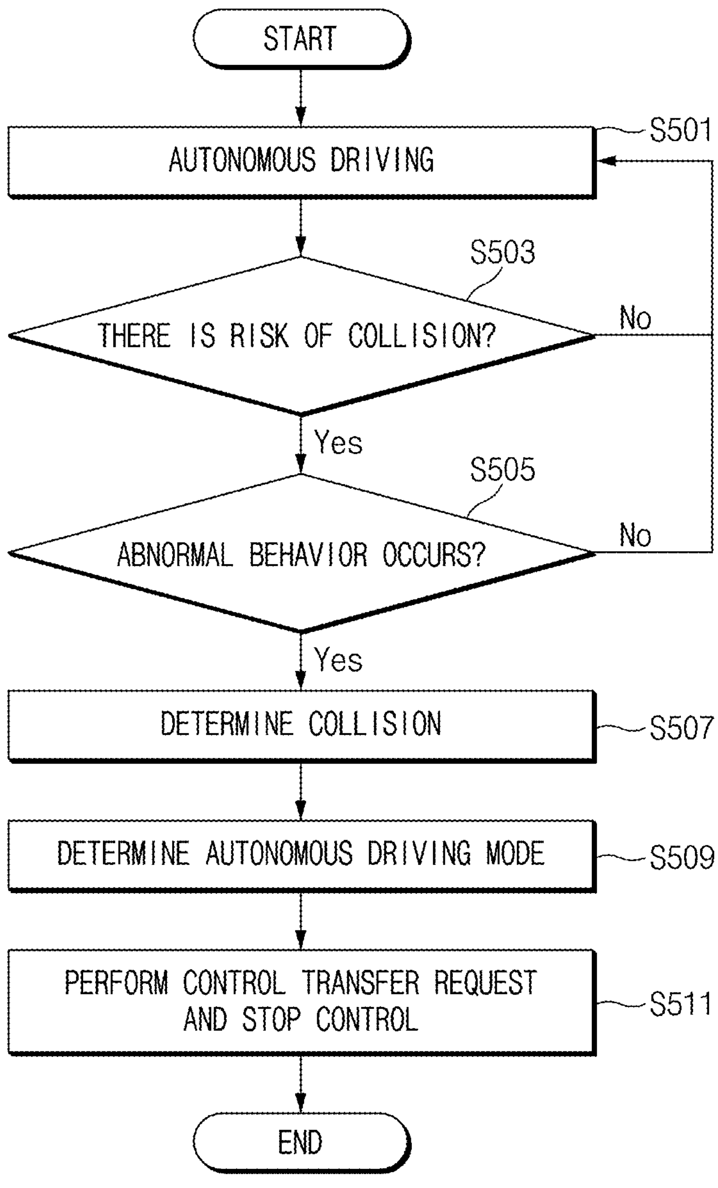
FIG. 5 is a flowchart illustrating a vehicle control method according to an embodiment of the present disclosure.

FIG. 5 shows an example of a flowchart associated with a vehicle control method, according to an embodiment of the present disclosure.

Hereinafter, it is assumed that the vehicle control apparatus 100 of FIG. 1 performs the process of FIG. 5. In addition, in a description of FIG. 5, it may be understood that an operation described as being performed by a processor is controlled by the processor 110 of the vehicle control apparatus 100.

At least one of operations of FIG. 5 may be performed by the vehicle control apparatus 100 of FIG. 1. Each of the operations in FIG. 5 may be performed sequentially, but is not necessarily sequentially performed. For example, the order of operations may be changed, and at least two operations may be performed in parallel.

Referring to FIG. 5, in operation S501, a vehicle control method according to an embodiment may include an operation of performing, by a processor (e.g., the processor 110 in FIG. 1), autonomous driving. For example, the vehicle control method may include an operation of causing a vehicle to drive autonomously by using a first mode associated with an autonomous driving mode of the vehicle.

In operation S503, the vehicle control method according to an embodiment may include an operation of determining whether there is a risk of collision. For example, the vehicle control method may include an operation of determining whether there is a risk of collision between the vehicle and an external object.

For example, the vehicle control method may include an operation of determining whether there is the risk of collision, based on the distance between the vehicle and the external object. For example, the vehicle control method may include an operation of determining whether there is a risk of collision between the vehicle and the external object, by using a distance between the vehicle and the external object based on the sensor fusing result of an autonomous driving sensor (e.g., at least one of a camera, LiDAR, or radar, or any combination thereof).

In one embodiment, the vehicle control method may include an operation of identifying that there is a risk of collision, based on a distance between the vehicle and the external object being smaller than or equal to a specified distance.

For example, the vehicle control method may include an operation of identifying that there is no risk of collision, based on the distance between the vehicle and the external object exceeding the specified distance.

When there is a risk of collision (Yes in operation S503), in operation S505, the vehicle control method according to an embodiment may include an operation of determining whether an abnormal behavior occurs. For example, the vehicle control method may include an operation of determining whether the abnormal behavior occurs in the vehicle. For example, the vehicle control method may include an operation of determining whether the abnormal behavior occurs in the vehicle, based on at least one of an acceleration acting on the vehicle, a yaw rate of the vehicle, a roll rate of the vehicle, or any combination thereof.

For example, the vehicle control method may include an operation of obtaining an impact value associated with the acceleration acting on the vehicle, the yaw rate of the vehicle, and the roll rate of the vehicle. The vehicle control method may include an operation of identifying that the abnormal behavior occurs, based on the impact value exceeding the impact threshold value. For example, the vehicle control method may include an operation of identifying that the abnormal behavior does not occur, based on the impact value being smaller than or equal to the impact threshold value.

When there is no risk of collision (No in operation S503), or the abnormal behavior does not occur (No in operation S505), in operation S501, the vehicle control method according to an embodiment may include an operation of maintaining autonomous driving of the vehicle.

When the abnormal behavior occurs (Yes in operation S505), in operation S507, the vehicle control method according to an embodiment may include an operation of determining a collision. For example, the vehicle control method may include an operation of determining a collision between the vehicle and the external object.

For example, the vehicle control method may include an operation of determining the collision between the vehicle and the external object when the distance between the vehicle and the external object is smaller than or equal to a specified distance and the impact value exceeds the impact threshold value.

In operation S509, the vehicle control method according to an embodiment may include an operation of determining an autonomous driving mode. For example, the vehicle control method may include an operation of determining whether to maintain the autonomous driving mode or to change the autonomous driving mode to a normal driving mode controlled by the user, based on determining the collision between the vehicle and the external object.

For example, the vehicle control method may include an operation of adjusting a level of the autonomous driving mode based on determining the collision between the vehicle and the external object.

In operation S511, the vehicle control method according to an embodiment may include an operation of performing a control transfer request and stop control. For example, the control transfer request may include a request for transferring control of the vehicle driving in the autonomous driving mode to the user. The vehicle control method may include an operation of performing the stop control such that the vehicle is stopped, based on identifying the collision between the vehicle and the external object.

As mentioned above, a vehicle control method according to an embodiment may include an operation of identifying the collision between the vehicle and the external object. The vehicle control method may include an operation of changing the driving mode of the vehicle based on identifying the collision between the vehicle and the external object. The vehicle control method may include an operation of responding to emergency situations by changing the driving mode of the vehicle based on identifying the collision between the vehicle and the external object.

Figure 6:
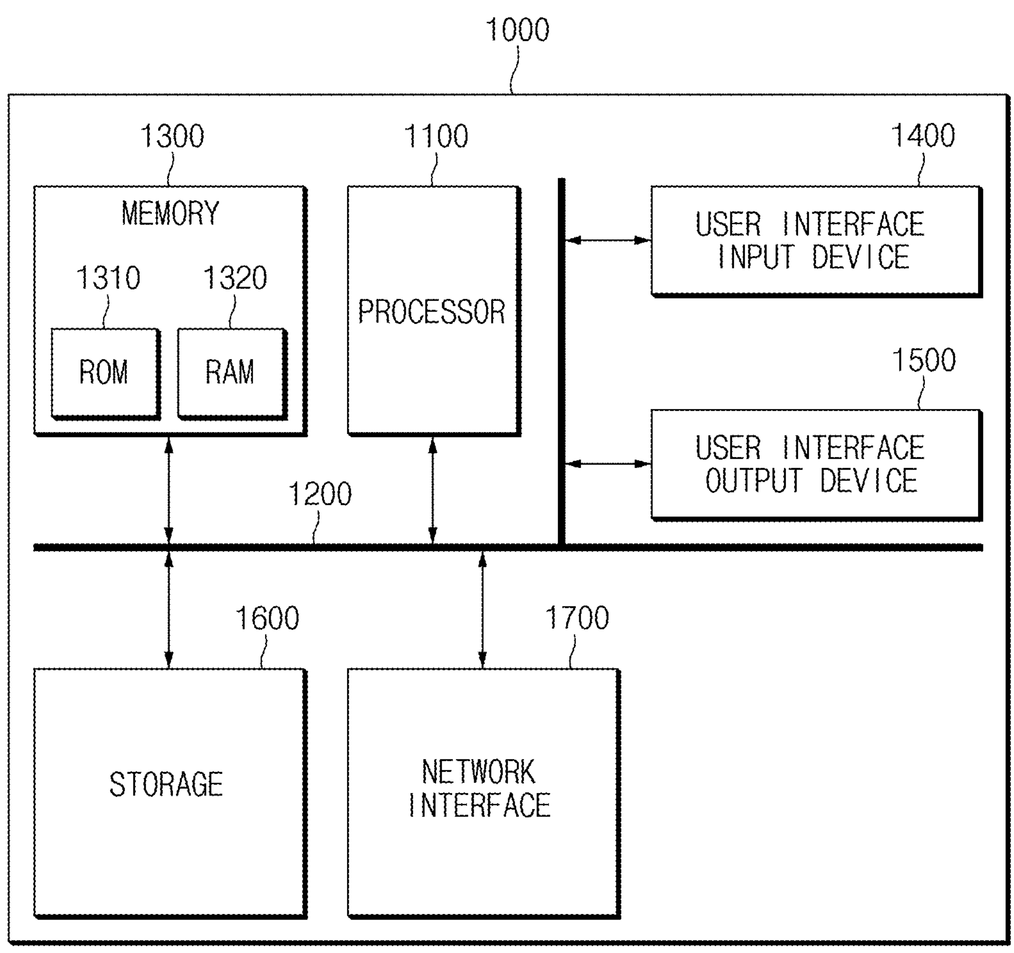
FIG. 6 is a block diagram illustrating a computing system associated with a vehicle control apparatus or vehicle control method, according to an embodiment of the present disclosure.

FIG. 6 illustrates a computing system associated with a vehicle control apparatus or vehicle control method, according to an embodiment of the present disclosure.

Referring to FIG. 6, a computing system 1000 may include at least one processor 1100, a memory 1300, a user interface input device 1400, a user interface output device 1500, storage 1600, and a network interface 1700, which are connected with each other via a bus 1200.

The processor 1100 may be a central processing device (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Accordingly, the processes of the method or algorithm described in relation to the embodiments of the present disclosure may be implemented directly by hardware executed by the processor 1100, a software module, or a combination thereof. The software module may reside in a storage medium (that is, the memory 1300 and/or the storage 1600), such as a RAM, a flash memory, a ROM, an EPROM, an EEPROM, a register, a hard disk, solid state drive (SSD), a detachable disk, or a CD-ROM. The exemplary storage medium is coupled to the processor 1100, and the processor 1100 may read information from the storage medium and may write information in the storage medium. In another method, the storage medium may be integrated with the processor 1100. The processor 1100 and the storage medium may reside in an application specific integrated circuit (ASIC). The ASIC may reside in a user terminal. In another method, the processor 1100 and the storage medium may reside in the user terminal as an individual component.

The present technology may identify a collision between a vehicle and an external object by using a distance between the vehicle and the external object, and an impact value Moreover, the present technology may accurately identify the collision between the vehicle and the external object by identifying the collision between the vehicle and the external object based on an acceleration acting on the vehicle and the distance between the vehicle and the external object.

Furthermore, the present technology may accurately operate in a driving mode of the vehicle by determining the driving mode of the vehicle based on identifying the collision between the vehicle and the external object.

Hereinabove, although the present disclosure has been described with reference to exemplary embodiments and the accompanying drawings, the present disclosure is not limited thereto, but may be variously modified and altered by those having ordinary skill in the art to which the present disclosure pertains without departing from the spirit and scope of the present disclosure.

What is claimed is:

1. A vehicle control apparatus comprising:

a collision risk determination device;

a collision determination device; and a processor configured to:

determine whether a second vehicle is present within a specified distance from a first vehicle, through the collision risk determination device;

determine a type of the second vehicle;

obtain an impact value associated with a collision between the first vehicle and the second vehicle based on an acceleration acting on the first vehicle, a yaw rate of the first vehicle, and a roll rate of the first vehicle through the collision determination device;

identify the second vehicle within the specified distance from the first vehicle for a specified time;

identify the collision between the first vehicle and the second vehicle based on the impact value exceeding an impact threshold value for the specified time, wherein the impact threshold value is determined based on the type of the second vehicle; and change a driving mode of the first vehicle from a first mode associated with an autonomous driving mode to a second mode controlled by a user based on a result of identifying the collision between the first vehicle and the second vehicle.

2. The vehicle control apparatus of claim 1, wherein the acceleration acting on the first vehicle includes a lateral acceleration acting in a lateral direction of the first vehicle, a longitudinal acceleration acting in a longitudinal direction of the first vehicle, and a vertical acceleration acting in a vertical direction of the first vehicle.

3. The vehicle control apparatus of claim 1, further comprising:

a communication circuit, wherein the processor is configured to:

receive object information including the type of the second vehicle and a state of the second vehicle through the communication circuit; and change the impact threshold value based on the object information.

4. The vehicle control apparatus of claim 3, wherein the processor is configured to:

change the impact threshold value to a first impact threshold value when the type of the second vehicle is a first type indicating at least one of a pedestrian, a bicycle, a two-wheeled vehicle, or any combination thereof;

change the impact threshold value to a second impact threshold value exceeding the first impact threshold value when the type of the second vehicle is a second type indicating a passenger vehicle; and change the impact threshold value to a third impact threshold value exceeding the second impact threshold value when the type of the second vehicle is a third type indicating at least one of a truck, a bus, or any combination thereof.

5. The vehicle control apparatus of claim 3, wherein the state of the second vehicle includes at least one of a speed of the second vehicle, a direction in which the second vehicle approaches the first vehicle, or any combination thereof.

6. The vehicle control apparatus of claim 3, wherein the processor is configured to:

apply a first weight to the impact threshold value based on the type of the second vehicle; and apply a second weight to the impact threshold value based on a relative speed between the second vehicle and the first vehicle.

7. The vehicle control apparatus of claim 1, further comprising:

a communication circuit, wherein the processor is configured to:

change the driving mode of the first vehicle from the first mode to the second mode and concurrently reduce a speed of the first vehicle when the impact value exceeds the impact threshold value and a difference between the impact value and the impact threshold value exceeds a reference value; and transmit a signal indicating that the first vehicle is in an emergency state, to an external electronic device including a server through the communication circuit.

8. The vehicle control apparatus of claim 1, wherein the processor is configured to:

make a request for changing the driving mode of the first vehicle from the first mode to the second mode based on a fact that the impact value exceeds the impact threshold value, and a difference between the impact value and the impact threshold value is smaller than or equal to a reference value; and restrict an acceleration of the first vehicle.

9. The vehicle control apparatus of claim 1, wherein the impact threshold value includes a threshold acceleration, a threshold yaw rate, and a threshold roll rate, and wherein the processor is configured to:

identify that the impact value exceeds the impact threshold value, based on a fact that the acceleration acting on the first vehicle exceeds the threshold acceleration, the yaw rate of the first vehicle exceeds the threshold yaw rate, and the roll rate of the first vehicle exceeds the threshold roll rate; and identify the collision between the first vehicle and the second vehicle based on the impact value exceeding an impact threshold value.

10. A vehicle control method, the method comprising:

determining, by a processor, whether a second vehicle is present within a specified distance from a first vehicle, through a collision risk determination device;

determining a type of the second vehicle;

obtaining an impact value associated with a collision between the first vehicle and the second vehicle based on an acceleration acting on the first vehicle, a yaw rate of the first vehicle, and a roll rate of the first vehicle through a collision determination device;

identifying the second vehicle within the specified distance from the first vehicle for a specified time;

identifying the collision between the first vehicle and the second vehicle based on the impact value exceeding an impact threshold value for the specified time, wherein the impact threshold value is determined based on the type of the second vehicle; and changing a driving mode of the first vehicle from a first mode associated with an autonomous driving mode to a second mode controlled by a user based on identifying the collision between the first vehicle and the second vehicle.

11. The method of claim 10, wherein the acceleration acting on the first vehicle includes a lateral acceleration acting in a lateral direction of the first vehicle, a longitudinal acceleration acting in a longitudinal direction of the first vehicle, and a vertical acceleration acting in a vertical direction of the first vehicle.

12. The method of claim 10, further comprising:

receiving object information including type of the second vehicle and a state of the second vehicle through a communication circuit; and changing the impact threshold value based on the object information.

13. The method of claim 12, further comprising:

changing the impact threshold value to a first impact threshold value based on the type of the second vehicle determined as a first type indicating at least one of a pedestrian, a bicycle, a two-wheeled vehicle, or any combination thereof;

changing the impact threshold value to a second impact threshold value exceeding the first impact threshold value based on the type of the second vehicle determined as a second type indicating a passenger vehicle; and changing the impact threshold value to a third impact threshold value exceeding the second impact threshold value based on the type of the second vehicle determined as a third type indicating at least one of a truck, a bus, or any combination thereof.

14. The method of claim 12, wherein the state of the second vehicle includes at least one of a speed of the second vehicle, a direction in which the second vehicle approaches the first vehicle, or any combination thereof.

15. The method of claim 12, further comprising:

applying a first weight to the impact threshold value based on the type of the second vehicle; and applying a second weight to the impact threshold value based on a relative speed between the second vehicle and the first vehicle.

16. The method of claim 10, further comprising:

changing the driving mode of the first vehicle from the first mode to the second mode and concurrently reducing a speed of the first vehicle based on the impact value exceeding the impact threshold value and a difference, between the impact value and the impact threshold value, exceeding a reference value; and transmitting a signal indicating that the first vehicle is in an emergency state, to an external electronic device including a server through a communication circuit.

17. The method of claim 10, further comprising:

making a request for changing the driving mode of the first vehicle from the first mode to the second mode based on a fact that the impact value exceeds the impact threshold value, and a difference between the impact value and the impact threshold value is smaller than or equal to a reference value; and restricting an acceleration of the first vehicle.

18. The method of claim 10, further comprising:

identifying that the impact value exceeds the impact threshold value, based on a fact that the acceleration acting on the first vehicle exceeds a threshold acceleration, the yaw rate of the first vehicle exceeds a threshold yaw rate, and the roll rate of the first vehicle exceeds a threshold roll rate, wherein the impact threshold value includes the threshold acceleration, the threshold yaw rate, and the threshold roll rate; and identifying the collision between the first vehicle and the second vehicle based on the impact value exceeding the impact threshold value.

* * * * *